R. GOOD, Jr.
CONTROLLING MECHANISM FOR GLASS FURNACES.
APPLICATION FILED SEPT. 3, 1914.
1,266,011.
Patented May 14, 1918.
2 SHEETS—SHEET 1.
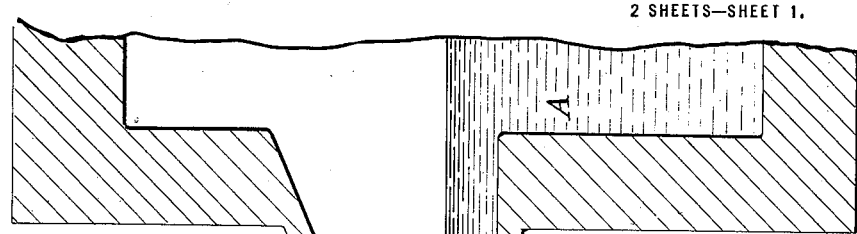
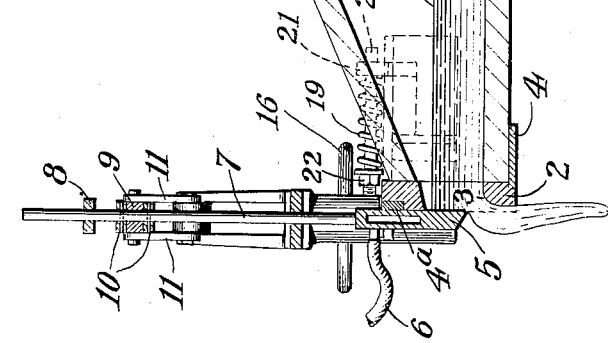
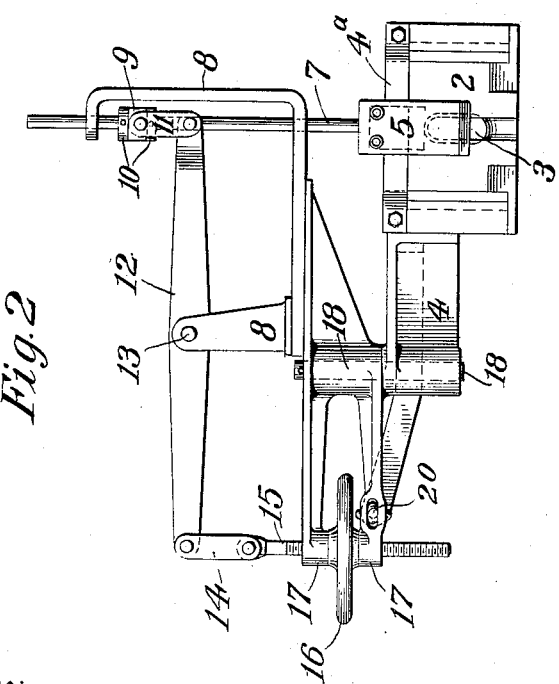
Witnesses:
Raphaël Setter
H. E. Long
Inventor
Robert Good Jr.
By his Attorney
Clarence D. Kent R. GOOD, Jr.
CONTROLLING MECHANISM FOR GLASS FURNACES.
APPLICATION FILED SEPT. 3, 1914.
1,266,011.
Patented May 14, 1918.
2 SHEETS—SHEET 2.
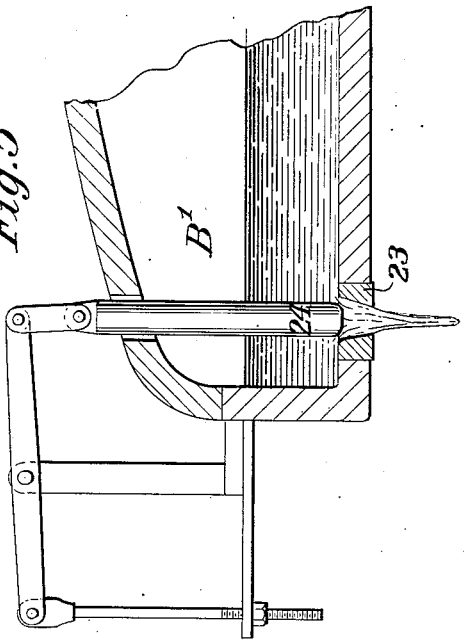
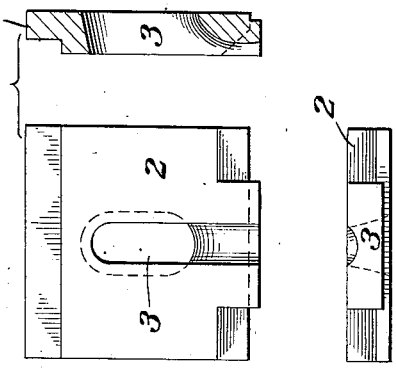
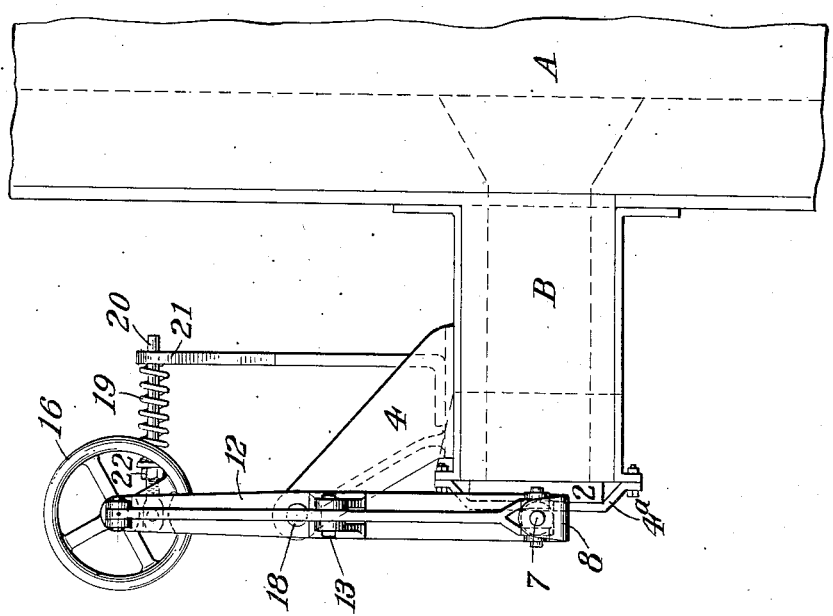
Witnesses:
Raphael Setter
H. E. Long
Inventor
Robert Good Jr
By his Attorney
Clarence Stew

UNITED STATES PATENT OFFICE.

ROBERT GOOD, JR., OF WASHINGTON, PENNSYLVANIA, ASSIGNOR TO HAZEL-ATLAS GLASS COMPANY, OF WHEELING, WEST VIRGINIA, A CORPORATION OF WEST VIRGINIA.

CONTROLLING MECHANISM FOR GLASS-FURNACES.

1,266,011.	Specification of Letters Patent.	Patented May 14, 1918.

Application filed September 3, 1914. Serial No. 859,986.

*To all whom it may concern:*

Be it known that I, ROBERT GOOD, Jr., a citizen of the United States, and a resident of Washington, county of Washington, and State of Pennsylvania, have invented new and useful Improvements in Controlling Mechanisms for Glass-Furnaces, of which the following is a specification, reference being had to the accompanying drawings, in which—

Figure 1 is a section showing my invention applied to the spout of a glass furnace; Fig. 2 is a front elevation thereof; Fig. 3 is a plan, and Fig. 4 shows details of the orifice for the spout. In Fig. 5 I have shown the form of gate usually employed for flowing glass from furnace spouts.

My invention relates to gates for spouts of glass furnaces, which are used for flowing a continuous stream of glass to molds or other receptacles. My invention consists in providing the end of the delivery spout with a bushing and in regulating the supply of glass passing through this bushing by an adjustable gate, thus providing an opening from the furnace, the size of which can be regulated at will and which I have found to be very durable and to be easily repaired. My invention provides a gate very simple in construction and operation and one which is very dependable and prevents the unexpected cutting off of the stream inherent in the gates now in use. My invention also consists in the construction and operation of the various parts which I shall hereinafter describe and claim.

Referring to the drawings, A is the furnace; B is the furnace spout through which the glass is flowed, and C indicates the normal level of the glass in the furnace and spout. The end of the spout B is provided with a clay bushing 2, having an orifice 3 to permit the flow of glass therethrough. The clay bushing 2 is mounted and carried on a cast iron frame 4 and is held in position by the plate or band 4ᵃ which bears against the upper surface of the bushing and is secured to the frame 4 by suitable bolts. Positioned on the clay bushing 2 is a water-cooled gate 5, adapted to regulate the size of the aperture 3 in the clay bushing. Water for cooling the gate is supplied through the hose connection 6. The gate 5 is carried by the rod 7 which seats in openings in the housing 8. Secured to the rod 7 is a block 9, held loosely in position thereon by the collars 10. Connected to the block 9 are the links 11 which, at their other ends, are secured to one end of the lever 12 which has a fulcrum 13 on the housing 8. At the end of the lever 12 remote from the links 11 are the links 14, which connect the lever to a screw stem 15 which seats in apertures in the housing 8 and has a threaded engagement with the regulator wheel 16 which is positioned between the arms 17 of the housing 8.

The housing 8 is mounted on a pivot pin 18 seated in the frame 4, so that the gate 5, mounted on the housing 8, will always be spring-pressed against the bushing 2 by the spring 19. The spring 19, which is mounted on a rod 20 secured to the housing 8, bears at one end against an extension 21 of the frame 4, and at its other end against an adjusting nut 22 by which the compression of the spring may be regulated as desired.

To permit the flow of glass from the spout B, the operator manipulates the regulator wheel 16, causing the screw stem 15 to be moved downwardly, thereby raising the gate 5 through the lever 12 and rod 7. When the stream of glass is flowing from the furnace spout, manipulation of the wheel 16 will permit exact regulation of the stream of glass to be obtained.

In Fig. 5 I have shown a furnace spout B' equipped with the usual clay bushing 23 through which the glass flows. A clay plug 24 is used to regulate the size of the aperture in the clay bushing 23 and to cut off the supply of glass flowing therethrough when desired. I have found that the bushing 23 usually lasts about one week, and the life of the clay plug 24 is extremely variable and usually breaks unexpectedly, with the result that a machine operated in connection with a spout equipped with such a controlling mechanism must be shut down until it can be renewed, which results in considerable delay.

With the construction shown in Figs. 1 to 4 the only part which must be occasionally renewed is the clay bushing 2, which can be speedily removed and replaced with little delay, and which normally lasts a month or more. The water cooled gate 5 is durable and needs renewal at very infrequent intervals.

It is obvious that various modifications may be made in the device which I have shown and described herein without departing from my invention.

What I claim is:

1. In an apparatus for flowing molten glass from a furnace or the like, a delivery spout, a clay bushing having an orifice therein through which the glass flows, and a water-cooled gate adapted to be moved across said orifice for regulating the flow of glass therefrom, the said gate having a pivotal mounting, the said mounting having spring mechanism for pressing the gate against said bushing.

2. In apparatus for flowing molten glass from a furnace or the like, a delivery spout, a clay bushing about an orifice in the spout through which the glass flows, a water-cooled gate, mechanism for moving said gate across said orifice, and resilient means mounted in said mechanism remote from the gate for causing the mechanism to force the gate against the bushing.

ROBERT GOOD, Jr.

Witnesses:
GILMER WESTON,
JOHN H. SWART.